May 13, 1924.

J. R. WILK 1,493,662

DENTURE PLATE

Filed Oct. 25, 1922

Inventor
Joseph R. Wilk
By Joshua R. H. Potts
His Attorney

Patented May 13, 1924.

1,493,662

UNITED STATES PATENT OFFICE.

JOSEPH R. WILK, OF CHICAGO, ILLINOIS, ASSIGNOR TO WILK DENTAL LABORATORY, OF CHICAGO, ILLINOIS.

DENTURE PLATE.

Application filed October 25, 1922. Serial No. 596,799.

*To all whom it may concern:*

Be it known that I, JOSEPH R. WILK, a citizen of the United States, and a resident of the city of Chicago, county of Cook, and State of Illinois, have invented certain new and useful Improvements in Denture Plates, of which the following is a specification.

This invention relates to denture plates, and has for its object the provision of a plate of this character, which is provided with cushioning means interposed between the plate and the gums of the wearer, such cushioning means at the same time producing a powerful suction effect, even upon a poorly fitting plate, in order to properly retain the plate in position.

Another object of the invention is to provide a plate of this character of one material, and employ in connection therewith cushioning means of yieldable material, together with means for fastening the cushioning means to the plate.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view showing the invention applied to the denture plate;

Figure 1:
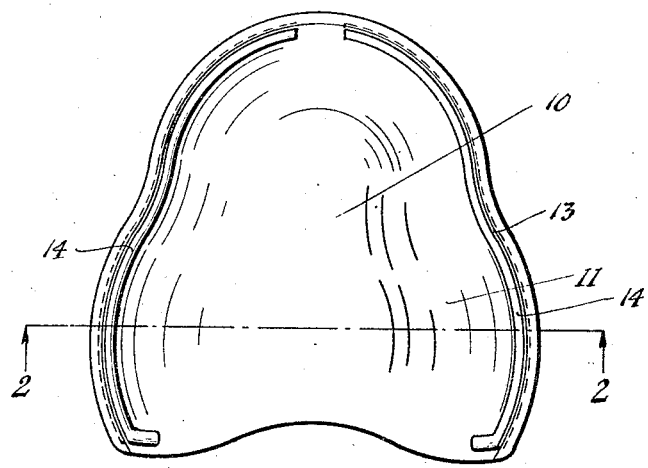
Figure 2:
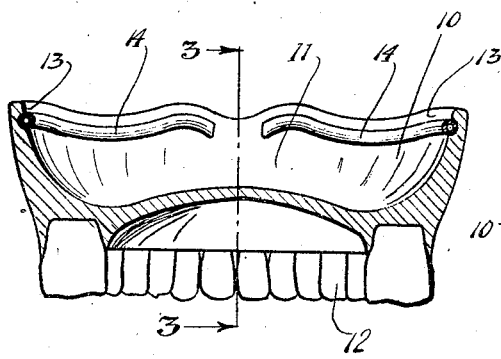
Fig. 2 is a section on the line 2—2 of Fig. 1.
Figure 3:
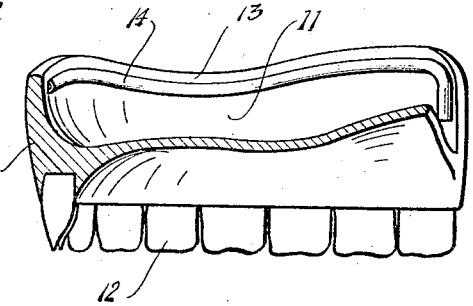
Fig. 3 is a section on the line 3—3 of Fig. 2.

Denture plates of the type ordinarily employed are of hard material, usually vulcanized rubber. The gum engaging surfaces of such denture plates are hard, and often rough and uneven, and consequently a source of pain and annoyance to the wearer thereof, the irregularity in the gum engaging surface also tending to reduce the suction between the plates and the roof of the mouth, especially when applied to persons having mouths with shallow roofs, or when the plates are poorly fitted. My invention contemplates the provision of a soft cushioning member of suitable material along the gum engaging portion of the hard plate, so as to afford a yieldable surface in contact with the gums, which surface at the same time is of such construction and conformation as to greatly enhance and increase the suction effect when the plate is fitted to the mouth of the wearer.

Referring to the drawings, 10 represents a denture plate of any suitable material, such plate having the usual suction cavity 11, teeth 12, and the gum engaging surfaces 13, in this instance the inner sides of the edge walls of the suction cavity 11. Disposed along the gum engaging edges 13 in the proper position are yieldably means 14 preferably in the form of a hollow rubber tube, as illustrated, such means preferably extending to a point adjacent each other at the forward end of the plate, and extending rearwardly, conforming to the configuration of the plate as shown, and terminating adjacent the rear end thereof, although such yieldable means may extend entirely around the gum engaging surfaces of the plate if desired.

Figure 4:
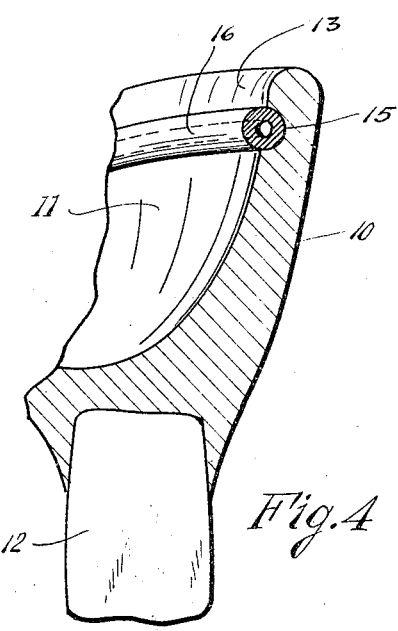
Fig. 4 is an enlarged fragmentary sectional view of the denture plate showing the invention applied thereto.
Figure 5:
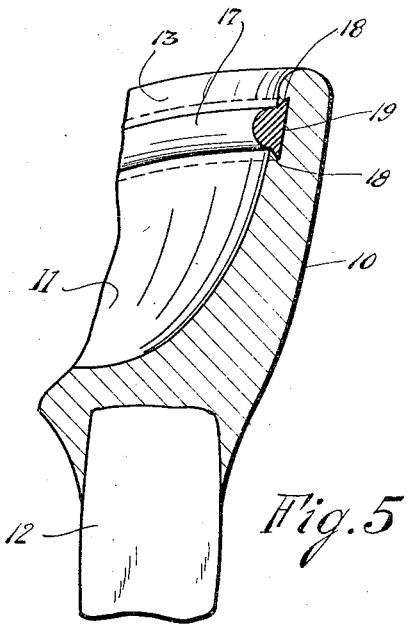
Fig. 5 is a view similar to Fig. 4 showing a modified form of the invention.
Figure 6:
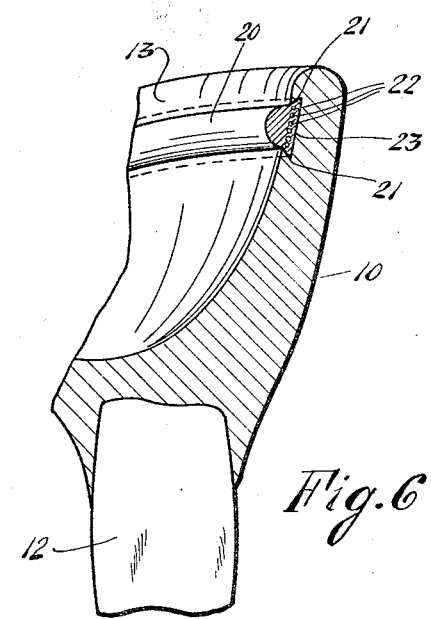
Fig. 6 is a view similar to Fig. 4 showing another modified form of the invention.

Various means 14 may be employed and secured in position by suitable fastening means, and I will illustrate and describe several forms of the cushioning means together with means for fastening the same in position. As shown in Fig. 4, a groove 15 is provided, in which a member 16 preferably consisting of a hollow tube, is disposed, such member being held therein by cement of any suitable kind. As shown in Fig. 5 a member 17, substantially half-round in cross section, is provided with flanges 18 adapted to project into a dove-tailed groove 19 formed in the plate 10. Fig. 6 shows a member 20 similar to that illustrated in Fig. 5, such member having flanges 21, the member 20 in this instance being reenforced by a strip of wire mesh 22 embedded therein, such member resting in a dove-tailed groove 23, in the same manner as explained above.

Figure 7:
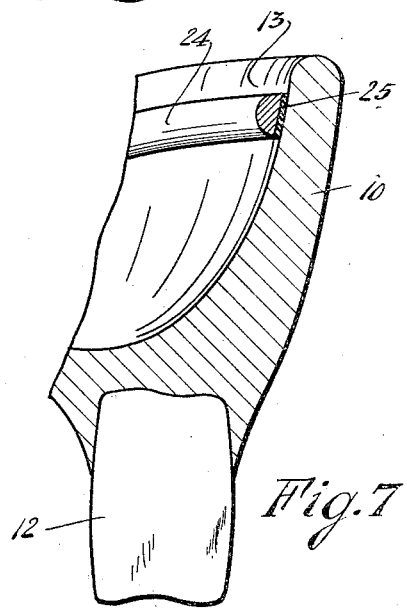
Fig. 7 is a view similar to Fig. 4 showing still another modified form of the invention.

In Fig. 7 the member 24 is illustrated as being half-round in cross section, said member being secured to the plate 10 by means of a strip of rubber 25, such strip being of a character as to vulcanize at a comparatively low temperature, so as to fasten the member 24 thereto and to the plate 10, the member 24 being of material requiring a high degree of heat to harden same.

By the above described arrangement means is provided for interposing cushioning means between the hard edges of ordinary denture plates and the gums of the wearer, the cushioning means at the same time greatly aiding and enhancing the suction efficiency of the plate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A denture plate including a suction cavity, the gum engaging inner side walls of said cavity being provided with grooves; and yieldable means disposed in said grooves and secured therein.

2. A denture plate including a suction cavity having grooves along its gum engaging portions; cushioning means adapted to be mounted in said grooves; and means projecting from said cushioning means for retaining said means in said grooves.

3. A denture plate including a suction cavity having grooves along its gum engaging portions; cushioning means adapted to be mounted in said grooves; and means projecting from said cushioning means for retaining said means in said grooves, said cushioning means being reenforced by a strip of fabric embedded therein.

4. A denture plate including a suction cavity having a cushioning member extending about the gum engaging surfaces thereof; and a rubber strip interposed between said cushioning member and said gum engaging surfaces, and vulcanized to said surfaces and said cushioning member.

In testimony whereof I have signed my name to this specification in the presence of two subscribing witnesses.

JOSEPH R. WILK.

Witnesses:
FREDA C. APPLETON,
MARGARET AUER.